Jan. 2, 1962 R. HOWARD ET AL 3,015,727
HIGH FREQUENCY CALL SYSTEM
Filed Feb. 18, 1957
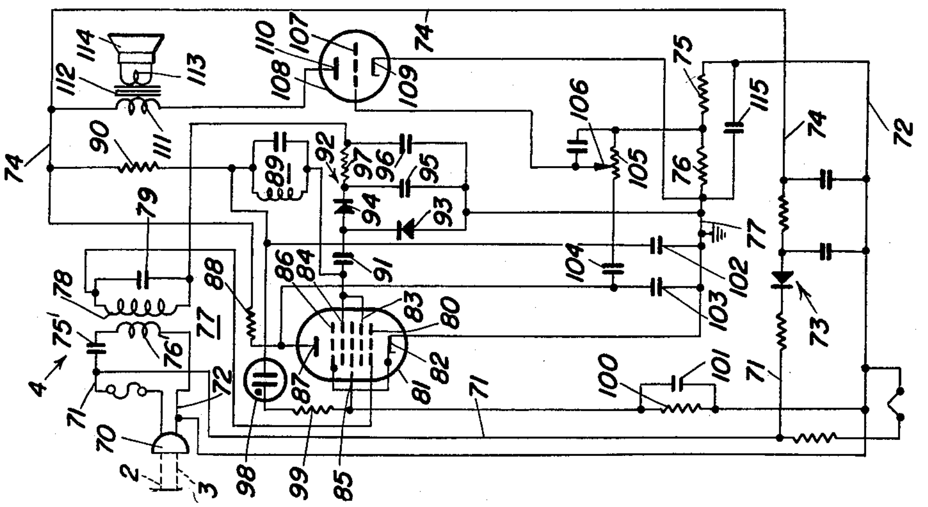
INVENTORS,
Ronald Howard
George P.M. Cochran
Hurvitz and Rose
ATTORNEY 3,015,727

HIGH FREQUENCY CALL SYSTEM

Ronald Howard and George P. M. Cochrane, both of 24 Ehrenbachgasse, Kitzbuhel, Austria Filed Feb. 18, 1957, Ser. No. 640,760
7 Claims. (Cl. 250—20)

The present invention relates to communication systems employing receivers adapted to receive information via power lines and more particularly to a communication system employing receivers which are normally maintained inoperative and are rendered operative by the application of carrier frequency signals thereto.

In communication systems employing a receiver adapted to receive modulated carrier frequency signals from an associated transmitter via existing power lines, it is desirable to maintain the receiver in an inoperative or silenced condition during intervals when no information is being transmitted by the transmitter. Silencing of the receiver prevents the reproduction of noise by the loudspeaker or earphones associated with the receiver, which noise results from switching and other transient condition appearing on the power lines. Although it is desirable to maintain the receiver incapable of reproducing audio signals during intervals when no information is being generated at the transmitter, it is desirable that the system respond rapidly to the generation of audio signals at the transmitter, so that a minimum of information is lost during the time required for the system to become operative.

In accordance with the present invention, a receiving system is provided for use in conjunction with a transmitter which transmits carrier signals only in response to the application of audio signals thereto. In the absence of carrier signals receiver is maintained incapable of reproducing audio signals. Upon receipt of the carrier signals by the receiver, the receiver is rendered operative to amplify and reproduce the intelligence signals originally applied to the transmitter.

The requirements for the receiver are such that it is desired to render the receiver operative to amplify intelligence signals upon receipt of a predetermined signal, the carrier signal in the case of the receiver. A gas diode is connected in the anode circuit of a normally conductive switch tube which is rendered less conductive in response to the receipt of carrier signals. Upon the tube becoming less conductive its anode voltage rises above the breakdown voltage of the gas diode. The gas diode is also connected in the control grid circuit of a normally non-conductive audio amplifier which is rendered conductive upon breakdown of the gas diode. In order to reduce the conductivity of the switch tube upon receipt of the carrier signals, the carrier signals are applied to a detector and then filtered to produce a negative bias which reduces the voltage on the grid of the switch tube and thereby reduces its conductivity. The gain of the audio signal amplifier in the receiver is also controlled by the integrated carrier signal in order to provide automatic gain control which varies the gain of the audio voltage amplifier inversely in accordance with the integrated amplitude of the carrier signals. Therefore, the carrier signals appearing at the receiver serve the dual function of rendering the receiver operative to reproduce audio signals and of controlling the gain of the audio signal amplifier in accordance with the intensity of the signals received at the receiver. In the preferred and illustrated embodiment of the present invention, a septode amplifying tube is employed for both the switching and audio voltage amplifying functions so that switching and gain control in accordance with the carrier signal may be accomplished by applying the integrated carrier signal to a single control grid of the septode.

It is, therefore, an object of the present invention to provide a receiver normally biased to its inoperative conditions and to provide circuits for rapidly rendering the receiver operative upon application of appropriate signals thereto.

It is another object of the present invention to provide receiver circuits adapted to receive modulated carrier signals via subsisting power line circuits and to normally suppress the receiver response so as to eliminate reproduction of noise voltages on the power lines when information is not being transmittted by the transmitter.

It is still another object of the present invention to provide a receiver circuit which is normally incapable of amplifying and reproducing audio signals and which is rendered operative to reproduce such signals upon the application of carrier signals thereto, and in which the gain of the audio signal amplification stages is varied inversely in accordance with the intensity of the carrier signal presented to the receiver.

The above and still further features, objects and advantages of the invention will become apparent upon consideration of the following detailed description of a specific embodiment of the invention, especially when taken in conjunction with the accompanying drawing, wherein:

The FIGURE is a schematic wiring diagram of the receiver of the present invention.

Referring now to the single figure of the accompanying drawing, there is provided a receiver unit generally designated by the reference numeral 4 which is adapted to receive information signals and power current from a pair of leads 2 and 3. The information signals and power current are coupled via a male connector 70 to leads 71 and 72 of the receiver, the lead 72 being connected to the negative power supply lead, for instance, the lead 3. Connected across the leads 71 and 72 is a rectifier and filter power supply 73 which may be of any conventional design and is illustrated for the purposes of explanation as a half wave rectifier followed by a resistor and dual capacitor filter unit. The positive voltage developed by the power supply 3 is applied to a voltage bus 74 while the negative lead 72 is connected via series arranged resistors 75 and 76 to a grounded bus 77. Also connected across the leads 71 and 72 is a series circuit comprising a coupling capacitor 75' and a primary winding 76' of a input transformer 77 having a secondary winding 78. The secondary winding 78 of the transformer 77 is shunted by a tuning capacitor 79, the winding 78 and capacitor 79 being tuned to the frequency of the carrier signals generated at the transmitter 1. One end of the tuning circuit is connected to a first grid 80 of a septode electron tube 81 having a cathode 82, second and fourth grids 83 and 84 electrically connected together, a third grid 85 and a suppressor or fifth grid 86 connected to the cathode 82. The septode 81 further includes an anode 87 which is connected through an anode load resistor 88 to the bus 74 while the cathode 82 is returned to the ground bus 77. The second and fourth grids 83 and 84 of the septode 81 are connected via a tank circuit 89, tuned to the frequency of the incoming carrier signals to a resistor 90 and through the resistor 90 to the high voltage bus 74. The grids 83 and 84 are further coupled through a coupling capacitor 91 to a second detector and filter circuit 92 which includes diodes 93 and 94 and a filter circuit including capacitors 95, 96 and a filtering resistance 97 connected between the capacitors. The junction of the resistor 97 and the capacitor 96 is connected to the lower end of the tuned circuit comprising winding 78 and capacitor 79 while the junction of the diode 93 and capacitor elements 95 and 96 is connected to the ground bus 77. The junction of the tuned circuit 89 and resistor 90 is connected via a series circuit comprising a gas diode 98, a resistor 99 and a further resistor 100 to the negative bus 72. The junction of the resistors 99 and 100 is connected to the third grid 85 of the tube 81 and the resistor 100 is by-passed by a by-pass capacitor 101. The junction of the tuned circuit 89 and resistor 90 is further connected via a capacitor 102 to the grounded bus 77 while the anode 87 of the tube 81 is returned to the bus 77 via a by-pass capacitor 103. The anode 87 is further coupled through a coupling capacitor 104 to one end of a variable tapped resistor 105. The other end of the resistor 105 is connected to the junction of the resistor elements 75 and 76 while a tap 106 of the resistance 105 is connected to a grid 107 of a power amplifying triode 108. The triode 108 further comprises a cathode 109 which is returned directly to the ground bus 77 and anode 110 is connected via primary winding 111 of an output transformer 112 to the high voltage bus 74. A secondary winding 113 of the output transformer 112 is coupled to a signal reproduction device 114 which is illustrated for the purposes of example only as an audio loudspeaker.

When carrier signals are not being received by the receiver 4, the capacitors 95 and 96 have substantially no voltage thereacross and the grid 80 and cathode 82 are at approximately the same potential. Consequently, the tube 81 conducts between cathode 82 and grid 84. The voltage drop across the resistor 90 is such that the voltage applied across the diode 98 is below the striking voltage of this diode and, consequently, the third grid 85 of the tube 81 is maintained at the potential of the bus 72. Inasmuch as the tube 81 is conducting between cathode 82 and grid 83, a current is drawn through the resistors 75 and 76 such that the cathode 82 of tube 81 has a positive bias with respect to the grid 85 and conduction between the cathode 82 and the anode 87 of the tube 81 is blocked. Further, the voltage drop across the resistors 75 and 76 is applied to the grid 107 of the power output tube 108, the cathode of which is returned to bus 77 and, therefore, the grid 107 is provided with a negative bias with respect to the cathode 109 for normal class A operation.

Carrier signals applied to the leads 2 and 3 are passed through the tuned circuit comprising the winding 78 and capacitor 79 to the grid 80 of the tube 81, the tuned circuit blocking 60 cycle frequencies and noise signals on the power lines 2 and 3 from entering the receiver. Upon the application of the modulated carrier signals to the grid 80, amplified intelligence modulated carrier signals appear at the grid 83 and proceed through the coupling capacitor 91 to the second detector and filter circuit 92. The time constant of the filter circuit is chosen such that the carrier signals are integrated to produce a negative bias voltage while the audio or intelligence signals are unaffected thereby. In consequence, a negative D.C. voltage having intelligence information riding thereon is applied to the grid 80, thereby, reducing conduction from the cathode 82 to the grid 83. Upon a reduction in conduction between the cathode 82 and grid 83, the voltage at the junction of the resistor 90 and tuned circuit 89 rises above the striking potential of the gas diode 98 and a positive potential is applied to the third grid 85 of the tube 81. More specifically, a voltage divider circuit comprising the resistor 90, diode 98, resistor 99 and resistor 100 is established between the buses 74 and 72, the voltage at the grid 85 being determined by the relative resistive values of these various elements. By properly choosing the values of these elements, a relatively high voltage is applied to the grid 85 and conduction between the cathode 82 and the anode 87 is permitted.

The use of a gas diode for switching purposes offers advantages over a circuit employing a switching tube.

A characteristic of gas diodes is that the voltage required to strike or start conduction is appreciably higher than the voltage required to maintain conduction once the diode has struck. This feature is used to advantage in the circuit described to provide an "on-off" switching differential. That is to say, the incoming signal level required to render the circuit operative is higher than the signal level required to maintain the circuit in operation. Thus, in cases where the incoming signal level is low, once the switching circuit has become operative it will continue to remain in operation as long as a carrier signal is present even through the signal level, due to external influences, should drop to a value which would normally be insufficient to operate the switching circuit. Thus, for weak signals, once the circuit has become operative, uninterrupted reception is assured even though the signal level should decrease appreciably below the switching-on level.

With circuits employing normal tubes for the switching circuit this feature is not obtained since the carrier input switching-on level is the same, or very near that of the switching-off level. In these cases an incoming signal level which varied in level about the minimum switching-on point would result in reception being interrupted each time the incoming signal level dropped below the minimum switching-on level. The intelligence signals applied to the grid 80 from the second detector and filter 92 now appear at the anode 87 and are coupled via coupling capacitor 104, resistance 105, and tap 106 to the grid 107 of the power output tube 108. The signals appearing at the grid 107 are amplified by the tube 108 and are coupled through the output transformer 112 to the intelligence signal reproduction device 114.

It should be noted that the carrier frequency signals appearing at the anode 87 are by-passed to ground by the by-pass capacitor 103. The capacitor 102 is employed to reduce the damping effect of the resistor 90 on the tuned circuit 89, this being necessary since a relatively high impedance resistor is employed for the resistor 90 in order to reduce the voltage at the junction of the tuned circuit 89 and resistor 90 to a value below the striking potential of the diode 98 when the section of the tube 81, comprising cathode 82 and grid 83 is conductive; that is, during the interval when the instrument is to be maintained inoperative. The capacitor 101 shunting the resistor 100 is employed to prevent the apparatus from being rendered operative upon the generation of transient signals on the lines 2 and 3. The value of the capacitor 101 is chosen such as to provide a short time delay which will filter out transients. As previously indicated, the capacitor 103 is employed to remove carrier signals from the signals appearing at the anode 87 and only a single capacitor filter 103 need be employed since only a relatively small portion of the carrier energy reaches the anode 87, the tuned circuit 89 in the load circuit of grids 83 and 84 and the isolating effect of the grid 84, insuring that most of the carrier energy is developed at these grids. A capacitor 115 is shunted across the series connected resistors 75 and 76 to by-pass signal currents since interaction might otherwise occur between the carrier and audio signals appearing at the cathode 82.

As indicated above, the rectified and filtered carrier frequency signals are employed to reduce the conduction of the tube 81 between the cathode 82 and grid 83 and thereby to switch on the audio signal amplifying sections. The rectified and filtered carrier signals serve the further function of controlling the gain of the audio signal amplifying section in accordance with the intensity of the carrier signals. Thus, upon variation of the intensity of the carrier for any reason which might be a reduction in signal produced by the transmitter, difficulties on the power lines, or reduction in the performance characteristics of the tube 81, the magnitude of the negative bias applied to the grid 80 will be reduced thereby increasing the gain of the audio frequency amplifying section. Conversely, upon an increase of the intensity of the carrier signal, the negative bias developed by the circuit 92 is increased and reduces the gain of the audio signal amplifying section. It is apparent, therefore, that the carrier signal is not only employed for switching the receiver 4 to the operative condition but also is employed to provide automatic gain control for the audio amplifying section of the tube 81.

It is desirable in the receiver 4 to insure rapid response of the receiver circuit to the receipt of the carrier signal, and a gas diode 98 is employed to obtain this immediate operation. Thus, upon receipt of carrier signal and decrease in conduction of the tube 81 to the grid 83, the voltage applied to the diode 98 is rapidly increased and the negative bias on the grid 85 is rapidly removed. A further novel arrangement is provided by the apparatus of the present invention in consequence of the high frequency amplifier comprising cathode 82, grid 80 and grids 83 and 84 preceding the rectifier and filter section 92. The use of the high frequency amplifying stage before the section 92 provides a strong discrimination between the relatively low frequencies of transient noises present on the electric power supply lines 2 and 3 and the required carrier signals also present on these lines. The tubes 81 and 108 are disclosed as separate tubes; however, it is within the purview of the present invention that a single tube comprising a septode-triode may be employed in place of the tubes 81 and 108, or conversely separate tubes may be employed for the high frequency amplifier, the audio voltage amplifier included in tube 81, and the audio power amplifier 108.

It is apparent from the above description that a receiver is provided which is normally in a blocked condition; that is, it is incapable of amplifying audio frequency signals. However upon the receipt of a carrier signal at the receiver, the receiver is rendered operative to amplify and reproduce audio and other intelligence signals. Further, variable attenuation of the carrier signals and, therefore, of the intelligence signals is compensated for at the receiver by varying the gain of the amplifier in accordance with the integrated intensity of the carrier signals. Further, there is provided a receiver which responds rapidly to receipt of intelligence and carrier signals.

Although the receiver of the present invention is disclosed as primarily intended to be employed for communication via power lines, it is not intended to limit the apparatus of the present application to such use. It is obvious that communication may be accomplished via power lines, telephone lines or via magnetic waves, in the latter case it being necessary to provide antennas at the transmitter and receiver.

While we have described and illustrated one specific example of the present invention, it will be clear that variations of the specific details of construction may be resorted to without departing from the true spirit of the invention as defined in the appended claims.

What is claimed is:

1. A receiver for carrier signals modulated with intelligence signals comprising amplifying means for the intelligence signals including first electron tube means, negative bias means for normally biasing said first electron tube means to cutoff, circuit means including second electron tube means for reducing the negative bias on said amplifying means in response to receipt of carrier signals, said last mentioned means including means for varying the gain of said amplifying means inversely with variations in the integrated amplitude of the carrier signals.

2. The combination in accordance with claim 1, wherein said circuit means comprises means for normally rendering said second electron tube means conductive, means for applying the carrier signals to said second electron tube means, second circuit means for reducing the conductivity of said second tube means in response to receipt of carrier signals and means for reducing the negative bias on said first electron tube means upon a reduction in conductivity of said second tube means.

3. The combination in accordance with claim 2, wherein said second circuit means comprises a detector and carrier signal filter, means for applying the output signals developed by said second electron tube means to said detector and filter, and means for coupling the output signals developed by said detector and filter means to said first circuit means.

4. The combination in accordance with claim 3, wherein said means for varying the gain of said amplifying means comprises means for applying the output signals of said detector and filter means to said amplifying means.

5. A receiver for carrier signals modulated with intelligence signals comprising an electron tube having a cathode, an anode and at least a first, a second and a third grid, means for applying the carrier signals to said first grid, circuit means for developing amplitude modulated carrier signals on said grid, means for applying a negative bias to said third grid to block conduction between said cathode and said anode, means for biasing said first grid to permit conduction between said cathode and said second grid, means responsive to the appearance of carrier signals at said second grid for reducing conduction between said cathode and said second grid to a degree dependent upon the integrated magnitude of the carrier signals, and means responsive to reduction of conduction between said cathode and said second grid for reducing the negative bias on said third grid a fixed predetermined amount to permit conduction between said cathode and said anode.

6. The combination according to claim 2 wherein said second tube means comprises a signal circuit and said first tube includes a bias control circuit and wherein said means for reducing comprises a voltage breakdown means connected between said signal circuit and said bias control circuit of said second tube means and said first tube respectively.

7. A receiver for carrier waves comprising a first amplifying circuit, means for applying carrier waves to said first amplifying circuit, means for producing a negative voltage by rectifying and integrating carrier signals developed by said first amplifying circuit, means for reducing the gain of said first amplifying circuit in proportion to the magnitude of said negative voltage, a second amplifying circuit, means for normally biasing said second amplifying circuit to operate at at least very low gain, means responsive to a reduction of gain of said first amplifying circuit for increasing the gain of said second amplifying circuit, and means for varying the gain of said second amplifying circuit as a function of the magnitude of said negative voltage.

References Cited in the file of this patent

UNITED STATES PATENTS

| | | |
|---|---|---|
| 2,243,719 | Peterson | May 27, 1941 |
| 2,287,862 | Brian | June 30, 1942 |
| 2,294,905 | Honaman et al. | Sept. 8, 1942 |
| 2,341,325 | Kenefake | Feb. 6, 1944 |
| 2,381,754 | Jadraque et al. | Aug. 7, 1945 |
| 2,767,310 | Walker | Oct. 16, 1956 |
| 2,808,507 | Pawloski | Oct. 1, 1957 |
| 2,809,289 | Harris et al. | Oct. 8, 1957 |